US008768618B1

(12) United States Patent  
Christie et al.

(10) Patent No.: US 8,768,618 B1  
(45) Date of Patent: Jul. 1, 2014

(54) DETERMINING A LOCATION OF A MOBILE DEVICE USING A MULTI-MODAL KALMAN FILTER

(71) Applicant: Google Inc., Mountain View, CA (US)

(72) Inventors: David Nicholas Christie, Mountain View, CA (US); Brian Patrick Williams, Mountain View, CA (US); Mohammed Waleed Kadous, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/936,202

(22) Filed: Jul. 7, 2013

Related U.S. Application Data

(60) Provisional application No. 61/823,679, filed on May 15, 2013.

(51) Int. Cl.
   *G01S 19/42* (2010.01)
   *G01C 21/00* (2006.01)

(52) U.S. Cl.
   CPC .................................. *G01C 21/005* (2013.01)
   USPC ............ 701/469; 701/480; 701/491; 701/526

(58) Field of Classification Search
   None
   See application file for complete search history.

(56) References Cited

U.S. PATENT DOCUMENTS

| | | | | |
|---|---|---|---|---|
| 5,311,195 | A * | 5/1994 | Mathis et al. ............ | 342/357.29 |
| 7,042,391 | B2 * | 5/2006 | Meunier et al. ............. | 342/464 |
| 7,355,513 | B1 * | 4/2008 | Brockel et al. ............ | 340/539.13 |
| 7,532,158 | B2 * | 5/2009 | Tekinay et al. .......... | 342/357.46 |
| 7,623,871 | B2 * | 11/2009 | Sheynblat .................. | 455/456.1 |
| 8,326,532 | B2 * | 12/2012 | Kmiecik et al. ............. | 701/472 |
| 8,374,624 | B2 * | 2/2013 | Baik et al. .................. | 455/456.1 |
| 8,374,784 | B2 * | 2/2013 | Mazlum et al. .............. | 701/469 |
| 8,588,097 | B1 * | 11/2013 | Ogale et al. .................... | 370/252 |
| 8,599,758 | B1 * | 12/2013 | Ogale et al. ................... | 370/328 |
| 8,639,640 | B1 * | 1/2014 | Kadous .......................... | 706/12 |
| 8,706,142 | B1 * | 4/2014 | Mishra ....................... | 455/456.3 |
| 2006/0080036 | A1 * | 4/2006 | Stefan .......................... | 701/300 |
| 2006/0217131 | A1 * | 9/2006 | Alizadeh-Shabdiz et al. .......................... | 455/456.1 |
| 2009/0128407 | A1 * | 5/2009 | Xie et al. ................. | 342/357.12 |
| 2013/0226451 | A1 * | 8/2013 | O'Neill et al. ............... | 701/450 |
| 2013/0303183 | A1 * | 11/2013 | Mansour .................... | 455/456.1 |
| 2013/0310064 | A1 * | 11/2013 | Brachet et al. ............. | 455/456.1 |
| 2014/0107918 | A1 * | 4/2014 | Friedler et al. ................ | 701/445 |

OTHER PUBLICATIONS

Muthukrishnan, Kavitha, "Multimodal Localisation—Analysis, Algorithms and Experimental Evaluation", CTIT Ph.D.-thesis Series, Wohrmann Print Service, Zutphen, The Netherlands, 2009.

* cited by examiner

*Primary Examiner* — John R Olszewski
*Assistant Examiner* — James M McPherson
(74) *Attorney, Agent, or Firm* — McDonnell Boehnen Hulbert & Berghoff LLP

(57) ABSTRACT

Methods and systems for determining a location of a mobile device using a multi-modal Kalman filter are described. According to an example method, a mobile device may maintain multiple approximations of a location of a mobile device. Each approximation includes an estimated geographic location of the mobile device that is determined by filtering a respective subset of location estimates received by the mobile device using a respective Kalman filter, and one of the multiple approximations is designated as an active approximation. The method also involves receiving data indicating an estimate of a geographic location of the mobile device and, based on a distance between the estimate of the geographic location and a given approximation of the multiple approximations, updating the given approximation using the estimate of the geographic location. Additionally, the method involves providing for display a visual indication of an estimated geographic location associated with the active approximation.

20 Claims, 9 Drawing Sheets

DETERMINING A LOCATION OF A MOBILE DEVICE USING A MULTI-MODAL KALMAN FILTER

CROSS-REFERENCE TO RELATED APPLICATIONS

This application claims the benefit of U.S. Provisional Application No. 61/823,679 filed on May 15, 2013, the entirety of which is herein incorporated by reference.

BACKGROUND

An increase in the number of mobile devices, such as smartphones, tablets, and wearable computing devices, over the past few years has led to the emergence and development of many mobile location-based services. A few of the most common mobile location-based services include mapping, navigation, and searching for nearby restaurants or stores. Other examples include geo-tagging pictures, sharing current locations with friends, "checking-in" to places on social networks, and receiving location-based deals and promotions.

Given the growing number of mobile devices and the popularity of mobile location-based services, it is therefore not surprising that some mobile devices include multiple different types of positioning systems for determining a geographic location of the mobile device. For example, many mobile devices have an integrated global positioning system (GPS) that is configured to determine the position of a mobile device by precisely timing signals sent by GPS satellites above the Earth. In addition, some mobile devices are also configured to make use of the presence of one or more particular wireless access points to estimate the position of the mobile device based on triangulation and/or fingerprinting. Each of the different positioning systems has advantages and disadvantages.

SUMMARY

In some instances, a first location estimate that is determined based on information from a first source may indicate that a mobile device is at a first location. Meanwhile, a second location estimate that is determined based on information from a second source may indicate that the mobile device is at a second location that is different than the first location. One approach to combining the first location estimate and the second location estimate is to average the first location estimate and the second location estimate. However, according to another approach, each of the first location estimate and the second location estimate may be evaluated separately using a multi-modal Kalman filter that runs multiple independent Kalman filters. Described herein are methods and systems for determining a location of a mobile device by using a multi-modal Kalman filter that maintains multiple location approximations.

In one example aspect, a method is provided. The method involves maintaining, by a mobile device, multiple approximations of a location of the mobile device. Each approximation includes an estimated geographic location of the mobile device that is determined by filtering a respective subset of location estimates received by the mobile device using a respective Kalman filter. One of the multiple approximations is designated as an active approximation. The method also involves receiving, by the mobile device, data indicating an estimate of a geographic location of the mobile device. The method further involves based on a distance between the estimate of the geographic location and a given approximation of the multiple approximations, updating the given approximation using the estimate of the geographic location. Additionally, the method involves providing, by the mobile device and for display, a visual indication of an estimated geographic location associated with the active approximation.

In another example aspect, a computer-readable medium having stored thereon instructions that, when executed by a mobile device, cause the mobile device to perform functions is provided. The functions include maintaining multiple approximations of a location of the mobile device. Each approximation includes an estimated geographic location of the mobile device that is determined by filtering a respective subset of location estimates received by the mobile device using a respective Kalman filter. One of the multiple approximations is designated as an active approximation. The functions also include receiving data indicating an estimate of a geographic location of the mobile device. The functions further include based on a distance between the estimate of the geographic location and a given approximation of the multiple approximations, updating the given approximation using the estimate of the geographic location. Additionally, the functions include providing for display a visual indication of an estimated geographic location associated with the active approximation.

In still another example aspect, a mobile device that includes a processor and a computer-readable medium is provided. The computer-readable medium may be configured to store instructions, that when executed by the processor, cause the mobile device to perform functions. The functions include maintaining multiple approximations of a location of the mobile device. Each approximation includes an estimated geographic location of the mobile device that is determined by filtering a respective subset of location estimates received by the mobile device using a respective Kalman filter. One of the multiple approximations is designated as an active approximation. The functions also include receiving data indicating an estimate of a geographic location of the mobile device. The functions further include based on a distance between the estimate of the geographic location and a given approximation of the multiple approximations, updating the given approximation using the estimate of the geographic location. Additionally, the functions include providing for display a visual indication of an estimated geographic location associated with the active approximation.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is a schematic illustrating a conceptual partial view of an example computer program product that includes a computer program for executing a computer process on a

DETAILED DESCRIPTION

Figure 1:
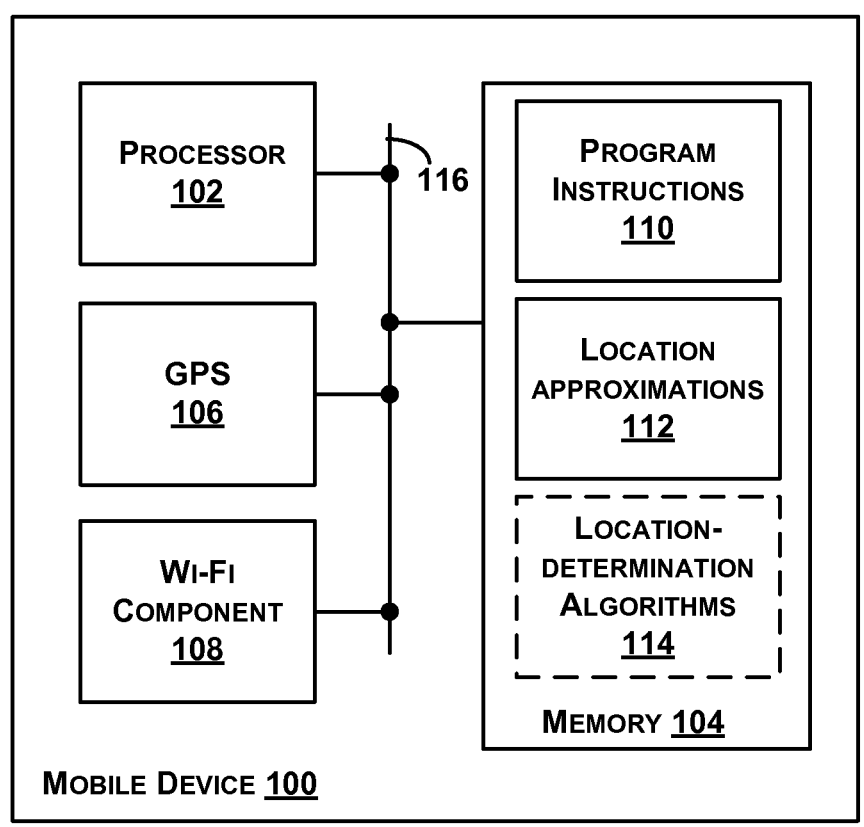
FIG. 1 illustrates an example mobile device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for determining a location of a mobile device using a multi-modal Kalman filter. In some instances, the multi-modal Kalman filter may be used to maintain different approximations as possible locations of the mobile device over time. Each of the different approximations may be an estimate of a location of the mobile device that is determined by filtering a subset of location estimates received by the mobile device using a Kalman filter. As data indicating new location estimates is received, the data may be used to update an appropriate approximation, depending on distances between the location estimate and each of the different approximations.

In one example, each subset of location estimates may be determined based on a respective manner of determining a location. For example, a first subset may be location estimates that are determined using GPS data and a second subset may be location estimates that are determined based on nearby wireless access points. In another example, each subset may be determined based on a distribution of the location estimates. For instance, each subset may correspond to a mode of the distribution. As an example, when a mobile device is in a building, the mobile device may receive a number of location estimates over time. A first group of location estimates may indicate that the mobile device is near a first room of the building while a second group of location estimates may indicate that the mobile device is near a second room of the building.

Additionally, the multi-modal Kalman filter may designate one of the approximations as an active approximation. When a request for a location of the mobile device is received, an estimated location associated with the active approximation may be returned. At any given time, the multi-modal Kalman filter may also switch which approximation is designated as the active approximation. For example, the active approximation may vary based on a particular approximation's consistency with recently received location estimates.

When using a Kalman filter to filter noisy location estimates, it is assumed that error terms and measurements have a Gaussian distribution. However, location estimates received from different sources (e.g., different types of sensors) may be multi-modal. As a result, filtering the multi-modal location estimates using a single Kalman filter may yield a location estimate that is inconsistent and erratic over time. Independently evaluating noisy location estimates that are received from different sources using a multi-modal Kalman filter is an attractive alternative that may yield more consistent results. For example, using a multi-modal Kalman filter may produce a location estimate that is smoother and more consistent over time when compared to a location estimate that is determined using a single Kalman filter.

In one example, a mobile device may be configured to receive location estimates that are determined using a GPS and receive location estimates that are determined based on nearby wireless access points. If a user of the mobile device is walking towards a building, the user may receive GPS estimates that are relatively smooth and consistent over time. The user may also receive location estimates which are determined based on signals received form wireless access points within the building that are inconsistent and fluctuating over time. Using a multi-modal Kalman filter may allow the mobile device to maintain a first approximation that is determined based on the GPS estimates as well as a second approximation that is determined based on the measurements associated with the wireless access points.

While the user is walking towards the building, the first approximation may be designated as the active approximation. However, as the user enters the building, the consistency of the location estimates determined based on wireless access points may improve. Conversely, the GPS estimates may become inconsistent, due to interference from the building's structure, for example. As a result, the multi-modal Kalman filter may switch to the second approximation as the active approximation.

In some examples, new approximation may be added to the multi-modal Kalman filter to evaluate one or more received location estimates that do not agree with existing approximations. In other examples, an existing approximation may be discontinued when location estimates that agree with the existing approximation are no longer received.

Although portions of this disclosure are described with respect to location estimates that are determined based on GPS data or wireless access points, the examples are not meant to be limiting. The methods and systems described are applicable to locations estimates that are determined using any system or technique. For instance, the methods and systems may also be applicable to location estimates that are derived based on one or more nearby cellular base stations of a cellular network. Various other functionalities of the systems and methods discussed above are also described hereinafter with reference to the accompanying figures.

Referring now to the figures, FIG. 1 illustrates an example mobile device 100. The mobile device 100 may represent any type of mobile computing device. By way of example, the mobile device 100 may be a mobile phone. However, the example is not meant to be limiting. In other instances, the mobile device 100 may be a laptop computer, tablet, wearable computing device, or other type of computing device.

As shown in FIG. 1, the mobile device 100 may include a processor 102, a memory 104, a GPS 106, and a Wi-Fi component 108. The processor 102 may be any type of processor, such as a microprocessor, digital signal processor, multicore processor, etc., coupled to the memory 104. The memory 104 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

The memory 104 may be configured to store program instructions 110, location approximations 112, and, optionally, location-determination algorithms 114. In one example, the program instructions 110 may be executable by the processor 102. For instance, the program instructions 110 may cause the processor 102 to maintain and update the location approximations 112 based on received data indicating location estimates. As an example, the GPS 106 may be configured to provide data indicating a location estimate to the processor 102 or store the data in the memory 104 for access by the processor 102. Additionally, the program instructions 110 may cause the processor 102 to select an active approximation from among the location approximations 112, add new location approximations to the location approximations 112, or discontinuing existing approximation from the location approximations 112.

In some examples, the processor 102 may execute one or more of the location-determination algorithms 114 to determine an estimate of the location of the mobile device using information received from the Wi-Fi component 108. In one instance, the Wi-Fi component 108 may be configured to scan for available wireless access points within a wireless range of the mobile device by broadcasting one or more probe requests. The processor 102 may then determine a location estimate using data from the scan and a location-determination algorithm.

As an example, data from the scan may identify an identity of one or more wireless access points (e.g., a MAC address) and an intensity of signals received (e.g. received signal strength indication) from each of the one or more wireless access points. The processor 102 may use the received signal strength indication (RSSI) from each unique wireless access point to determine a distance from each wireless access point. The processor 102 may then compare the distances to a database that stores information regarding where each unique wireless access point is located. Based on the distance from each wireless access point, and the known location of each of the wireless access point, the processor 102 may determine a location estimate of the mobile device 100.

In another example, data from the scan may include data indicating a fingerprint that is determined based on a pattern of signals received from one or more wireless access points. The processor 102 may execute a location-determination algorithm that involves comparing the fingerprint to one or more known calibration points for which a geographic location is known. Various deterministic algorithms, such as nearest neighbor in signal space (NNSS), k-nearest neighbor (KNN), and weighted k-nearest neighbor (WKNN), may be used by the processor 102 to determine a closest calibration point to the fingerprint. Probabilistic methods may also be used to determine a most likely location based on a relationship between the fingerprint and known calibration points.

In another instance, the processor 102 may execute a location-determination algorithm that involves computing a position of the mobile device 100 using decision trees. For example, the decision trees may be based on a model of wireless network signal strength for an indoor area, and may correlate signal strengths from one or more wireless access points to a position of a mobile device within the indoor area. The decision trees may be stored at a remote server, and downloaded to the mobile device to be executed. An output of the decision trees may indicate the mobile device's position. In some examples, multiple decision trees may be used, and the outputs of the decision trees may be averaged to provide a more reliable result. In still another instance, the processor 102 may execute a location-determination algorithm that involves localizing the mobile device 100 in an indoor area based on the strength of wireless network signals accessible in the indoor area from different wireless access points. For efficiency, the localization may be performed in stages. In a first stage, a general geographic area in which the mobile device is located, or an "island", is identified. In a second stage, an altitude or building level of the mobile device is identified. In a third stage, a position of the mobile device on the identified building level is determined. At least some of these stages of localization may utilize information received at the mobile device from surrounding wireless access points. For example, the island on which the mobile device is located may be determined by identifying at least one wireless access point on the island. Further, determination of a building level and a position on that level may be determined using any of a number of classifiers, such as decision trees, Bayesian models, Nearest Neighbor, Gaussian Mixtures, etc. For example, as described above, decision trees may be executed using input related to a received signal strength from the surrounding wireless access points, and outputs of the decision trees may indicate the mobile device's location In other examples, data from the scan may be provided by the mobile device to a server in a cloud. The server may then process the data, and return data indicating an estimate of a geographic location of the mobile device 100 to the mobile device 100.

As shown in FIG. 1, each of the processor 102, memory 104, GPS 106, and Wi-Fi component 108 may be coupled together by one or more system buses, networks, or other connection mechanisms 116.

In some implementations, the mobile device 100 may include a device platform (not shown), which may be configured as a multi-layered Linux platform. The device platform may include different applications and an application framework, as well as various kernels, libraries, and runtime entities. In other examples, other formats or systems may operate the mobile device 100 as well.

Figure 2:
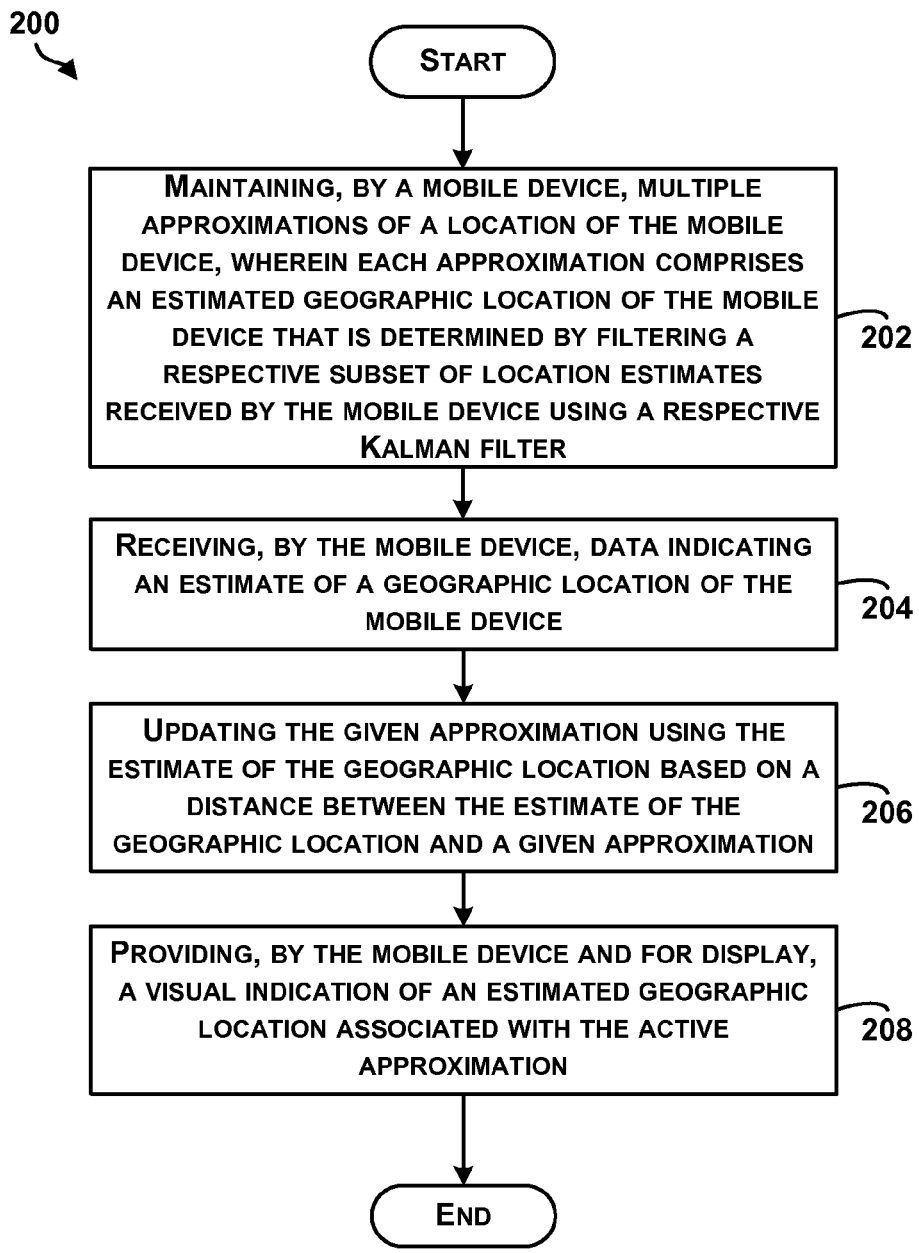
FIG. 2 is a block diagram of an example method for determining a location of a mobile device.

FIG. 2 is a block diagram of an example method 200 for determining a location of a mobile device. Method 200 shown in FIG. 2 presents an embodiment of a method that could be used or implemented by the mobile device 100 of FIG. 1 or by components of the mobile device 100, for example, or more generally by any computing device. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes maintaining, by a mobile device, multiple approximations, wherein each approximation comprises an estimate geographic location of the mobile device that is determined by filtering a respective subset of location estimates received by the mobile device using a respective Kalman filter. For purposes of illustration, each of the approximations may be thought of as an independent hypothesis about where the mobile device is located that is updated over time using a respective Kalman filter. As new data indicating estimates of a location of the mobile device is received, the new data may be used to update the multiple approximations.

In one example, each subset of location estimates may be determined based on a respective manner of determining a location. For example, a first subset may be location estimates that are determined using GPS data and a second subset may be location estimates that are determined based on nearby wireless access points.

In another example, each subset may be determined based on a distribution of the location estimates. For instance, each subset may correspond to a mode of the distribution. As an example, when a mobile device is in a building, the mobile device may receive a number of location estimates over time. A first group of location estimates may indicate that the mobile device is near a first room of the building while a second group of location estimates may indicate that the mobile device is near a second room of the building.

In one instance, a user of a mobile device may be inside of a building that has multiple wireless access points. In response to scanning for nearby wireless access points, the mobile device may have received data indicating varying estimates of where the mobile device is located. For example, separate location-determination algorithms may have been used to estimate a location of the mobile device, and each may have yielded a different estimate of where the mobile device is located. In one example, the mobile device may have received data indicating that the mobile device is in a first room and also have received data indicating that the mobile device is in a second room. In order to evaluate each of the potential locations of the mobile device, the mobile device may maintain two separate location approximations. As new data is received that indicates the mobile device is in the first room, a first approximation may be updated. Similarly, as new data is received that indicates that the mobile device is in the second room, a second approximation may be updated.

In another example, a mobile device may maintain a first location approximation to filter location estimates determined using GPS and a second location approximation to filter location estimates determined based on nearby wireless access points. Over time, as the mobile device receives location estimates that are determined using a GPS, the location estimates may be filtered using a first Kalman filter. Similarly, as the mobile device receives location estimates that are determined based on nearby wireless access points, the location estimates may be filtered using a second Kalman filter.

Additionally, maintaining the multiple independent location approximations may involve maintaining a designation regarding which of the multiple approximations is an active approximation. In one example, the mobile device may be configured to designate one of the multiple approximations as the active approximation. In response to receiving a request for the location of the mobile device (e.g., a request from an application of a mobile) an estimated geographic location associated with the approximation that is designated as the active approximation may be provided as the estimate of the location of the mobile device. For example, the estimated geographic location associated with the active approximation may be provided for display within a navigation application of the mobile device to indicate a location of the mobile device.

The approximation that is designated as the active approximation may vary. For example, the active approximation may vary based on which approximation most of the recently received location estimates closest agrees with. As an example, if five of the past six location estimates received by the mobile device are closest to a first approximation, the mobile device may designate the first approximation as the active approximation.

At block 204, the method 200 includes receiving, by the mobile device, data indicating an estimate of a geographic location of the mobile device. In some examples, the data may be received from a location-determination component of the mobile device. For example, the location-determination component may be a GPS. As another example, the location-determination component may be a Wi-Fi component that is configured to scan for wireless access points within a wireless range of the mobile device and determine an estimate of the location of the mobile device by executing one or more location-determination algorithms. The location-determination algorithms may be similar to the location-determination algorithms 114 of FIG. 1, for instance. In another example, the data may be received from a server that processes GPS data or Wi-Fi scan data for the mobile device.

At block 206, the method 200 includes updating the given approximation using the estimate of the geographic location based on a distance between the estimate of the geographic location and a given approximation of the multiple approximations. In one example, the mobile device may determine that a closest approximation to the estimate of the geographic location is the given approximation. The mobile device may make the determination by determining a distance between the estimate of the geographic location and each respective approximation, and determining which distance is the smallest. In response to making the determination, the mobile device may filter the data indicating the estimate of the geographic location using a Kalman filter that is associated with the given approximation. Filtering the estimate of the geographic location may yield an updated estimated geographic location for the given approximation.

At block 208, the method 200 includes providing, by the mobile device and for display, a visual indication of an estimated geographic location associated with the active approximation. In one instance, the visual indication may be provided for display within an application of the mobile device. For example, the application may be an application that indicates the location of the mobile device on a map as a user walks, runs, cycles, drives, etc.

As discussed briefly above, the approximation that is designated as the active approximation may vary. For example, at a first instance in time, the active approximation may not be the approximation of block 206. However, in response to subsequently receiving a predetermined number of estimates of geographic locations of the mobile device that are closest to the given approximation, the mobile device may designate the given approximation as the active approximation.

In a further example, the method 200 may also involve receiving data indicating a second estimate of a geographic location of the mobile device. In response to determining that the second estimate of the geographic location of the mobile device is not within a threshold distance of any of the multiple approximations maintained by the mobile device, the mobile device may begin to maintain a new approximation based on the second estimate of the geographic location of the mobile device. In one instance, the threshold distance may be a predetermined distance (e.g., 10 meters, 20 meters, etc.). In another instance, the threshold distance may vary according to each approximation.

For example, each approximation may have a threshold distance that is dynamically determined based on an estimated amount of error associated with the approximation at a given point in time. In one instance, a first approximation may have an estimated amount of error of four meters, such that the threshold distance associated with the first approximation is four meters. Similarly, a second approximation may have an estimated amount of error of ten meters, such that the threshold distance associated with the second approximation is ten meters. In such a scenario, the mobile device may determine whether the second estimate is within four meters of the first approximation and whether the second estimate is within ten meters of the second approximation. If the second estimate is not within four meters of the first approximation or ten meters of the second approximation, the mobile device may begin to maintain a new approximation.

Additionally, if the mobile device subsequently receives a predetermined number of estimates of geographic locations of the mobile device that are closest to the new approximation, the mobile device may designate the new approximation as the active approximation. In a similar example, the mobile device may determine that a majority of a recent number of received location estimates are closest to the new approximation, and responsively designate the new approximation as the active approximation.

In other examples, the method 200 may also involve discontinuing or disregarding a particular approximation of the multiple approximations in response to subsequently receiving a predetermined number of estimates of geographic locations of the mobile device that are not within a threshold distance of the particular approximation. For example, if all of the predetermined number of estimates of geographic locations of the mobile device are not within a threshold distance of an estimated geographic location associated with the particular approximation, the mobile device may stop maintaining the particular approximation as a potential location of the mobile device. In a similar example, the mobile device may stop maintaining the particular approximation in response to having a predetermined time period elapse without subsequently receiving any estimates of geographic locations of the mobile device that are within a threshold distance of the particular approximation. For instance, the mobile device may maintain a timer for each approximation that is restarted each time a location estimate is used to update a respective approximation. If a given approximation is not updated before a timer associated with the given approximation reaches a predetermined amount of time, the mobile device may responsively stop maintaining the given approximation.

Examples of independent approximations that may be maintained by a mobile device over time are now described with reference to FIGS. 3A-3E. In particular FIGS. 3A-3E conceptually illustrate example approximations that may be maintained by a mobile device as a user of the mobile device walks through an environment. As shown in FIGS. 3A-3E, the environment includes a first building 302 and a second building 304. Each of the first building 302 and second building 304 is assumed to have at least one wireless access point. In each of FIGS. 3A-3E, an active approximation is represented by a shaded circle, while other approximations are represented by unfilled circles.

Figure 3A:
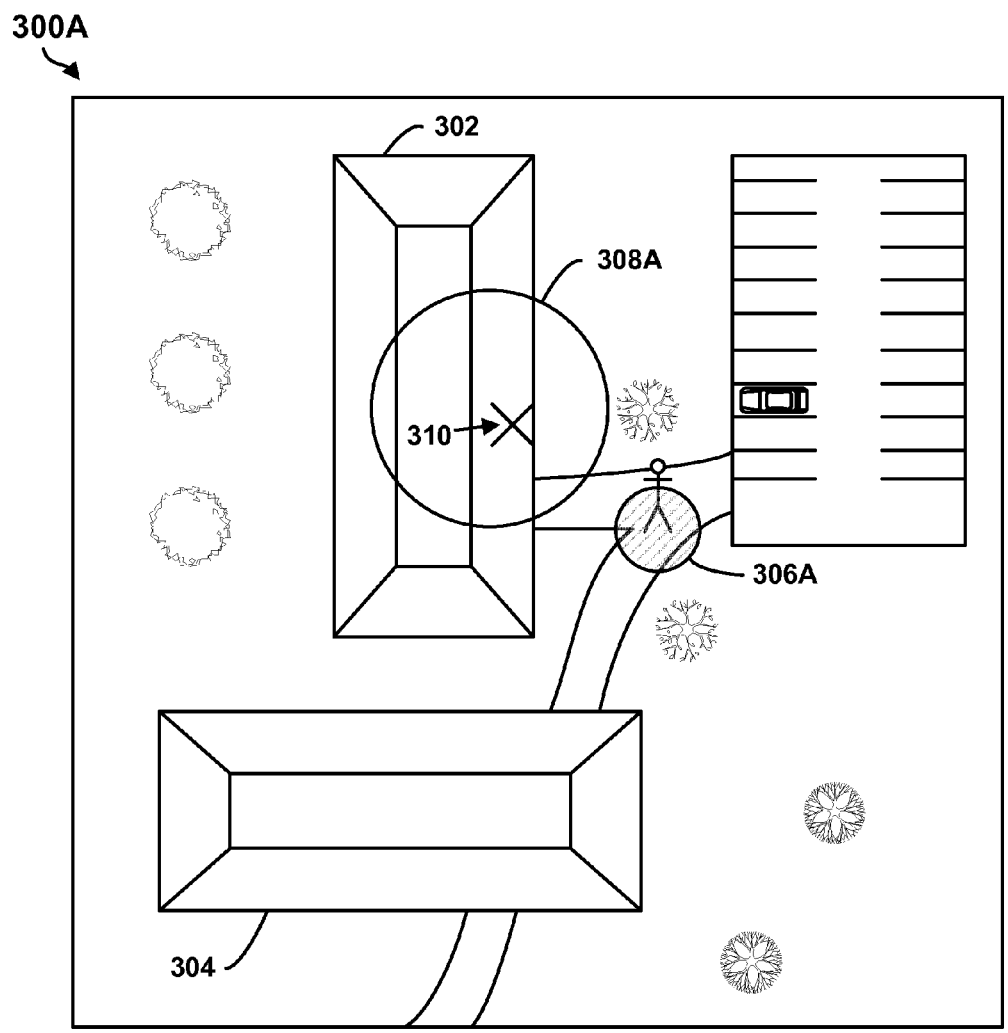
FIGS. 3A-3E are example conceptual illustrations of location approximations that may be maintained by a mobile device.

As shown in FIG. 3A, as a user is walking towards the first building 302, a mobile device may maintain two independent approximations, a GPS approximation and a Wi-Fi approximation. The GPS approximation is represented by the circle 306A and is currently designated as the active approximation. The GPS approximation may be determined by using a first Kalman filter to filter GPS data over time. The estimated geographic location of the GPS approximation is assumed to be the center of the circle 306A. Additionally, an estimated amount of error in the estimated geographic location is represented by a size of the circle 306A.

The Wi-Fi approximation is represented by a circle 308A. The Wi-Fi approximation may be determined by using a second Kalman filter to filter location estimates that have been determined based on nearby wireless access points. For example, the Wi-Fi approximation may have been determined based on signals received from one or more wireless access points within the first building 302. As with the GPS approximation, the estimated geographic location of the Wi-Fi approximation is assumed to be the center of the circle 308A, and an estimated amount of error in the estimated geographic location is represented by the size of the circle 308A.

Additionally, FIG. 3A illustrates a location estimate 310 that may be received by the mobile device. In one example, the mobile device may receive the location estimate 310 based on signals received from the one or more wireless access points within the first building 302.

Figure 3B:
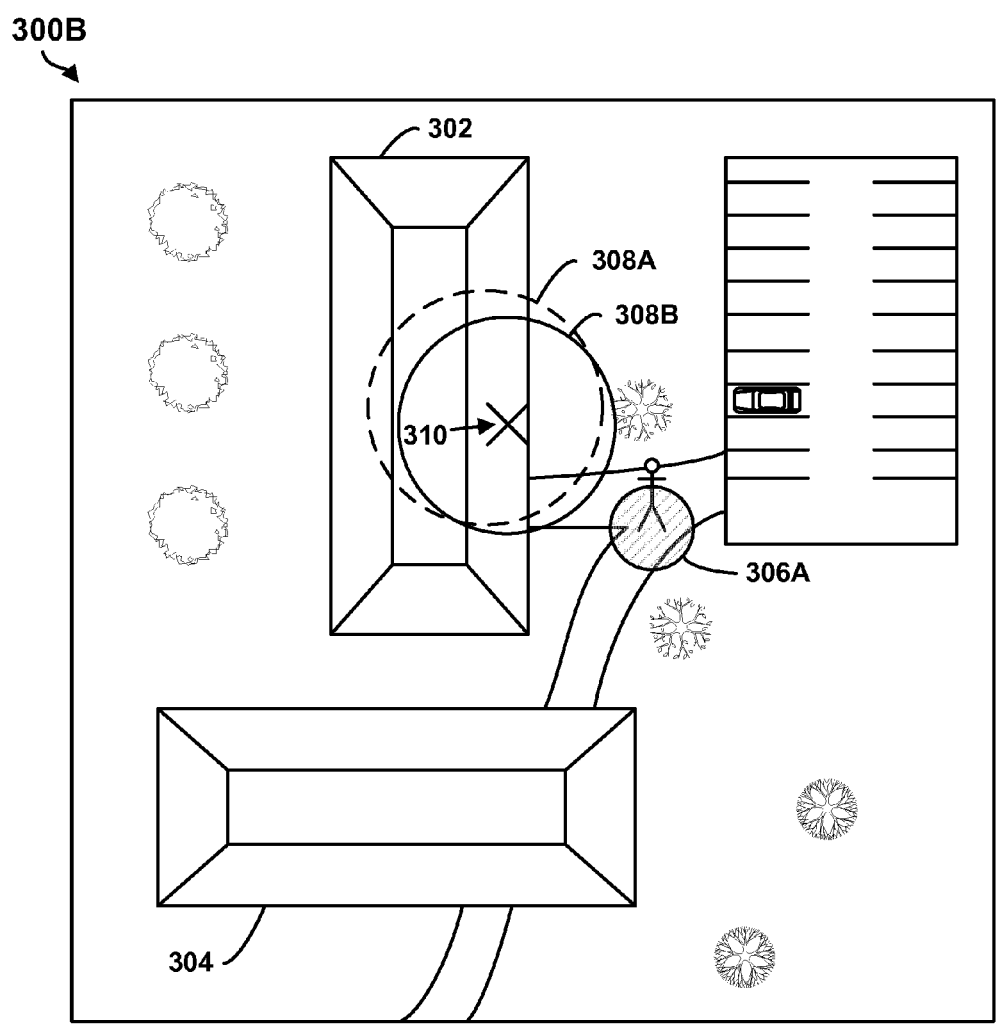

FIG. 3B conceptually illustrates how the Wi-Fi approximation may be updated using the location estimate 310. As shown in FIG. 3B, a circle 308B represents an updated estimated geographic location associated with the Wi-Fi approximation. In one example, the second Kalman filter may be used to filter the location estimate 310. As a result, the estimated geographic location of the Wi-Fi approximation may be updated. For purposes of comparison, the circle 308A (now having a dotted border) is also shown. Also, note that the GPS approximation has not been updated based on the location estimate 310 because, for example, the location estimate 310 is not within a threshold distance of the GPS approximation.

Figure 3C:
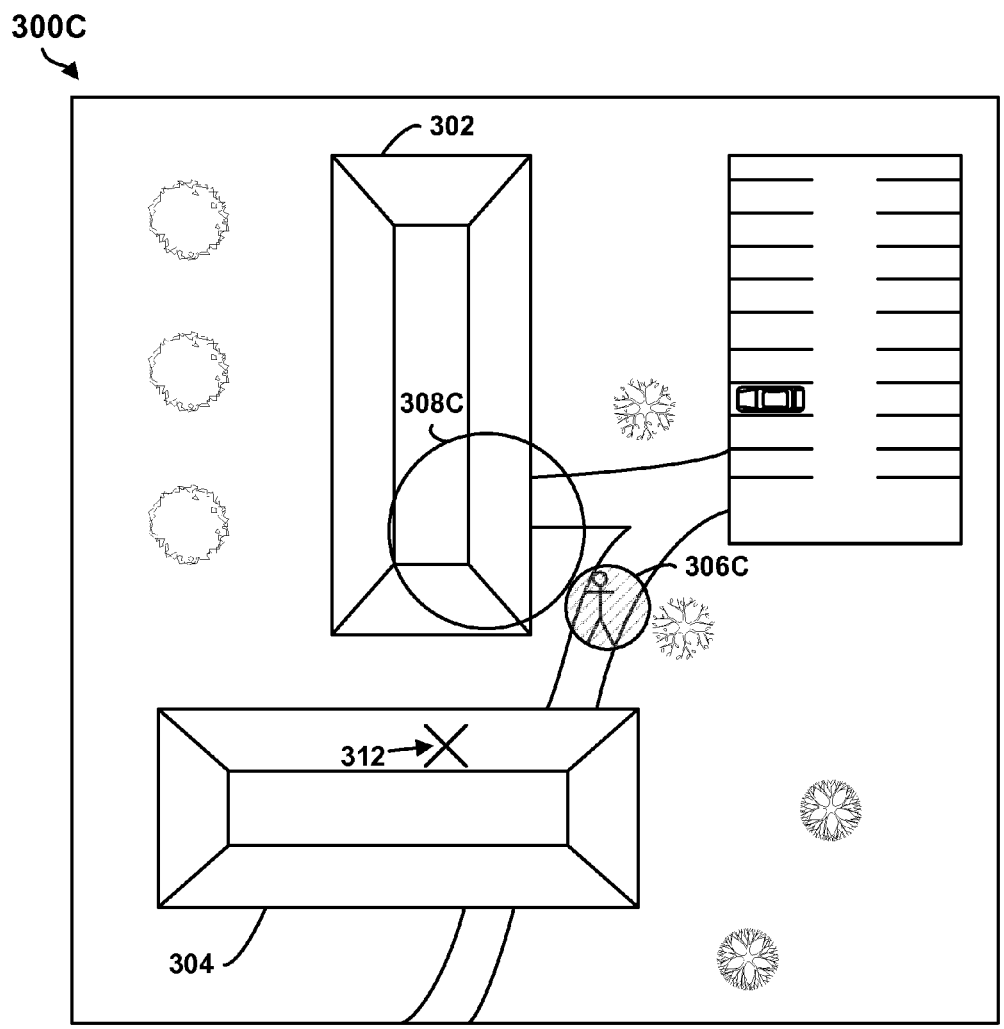
Figure 3D:
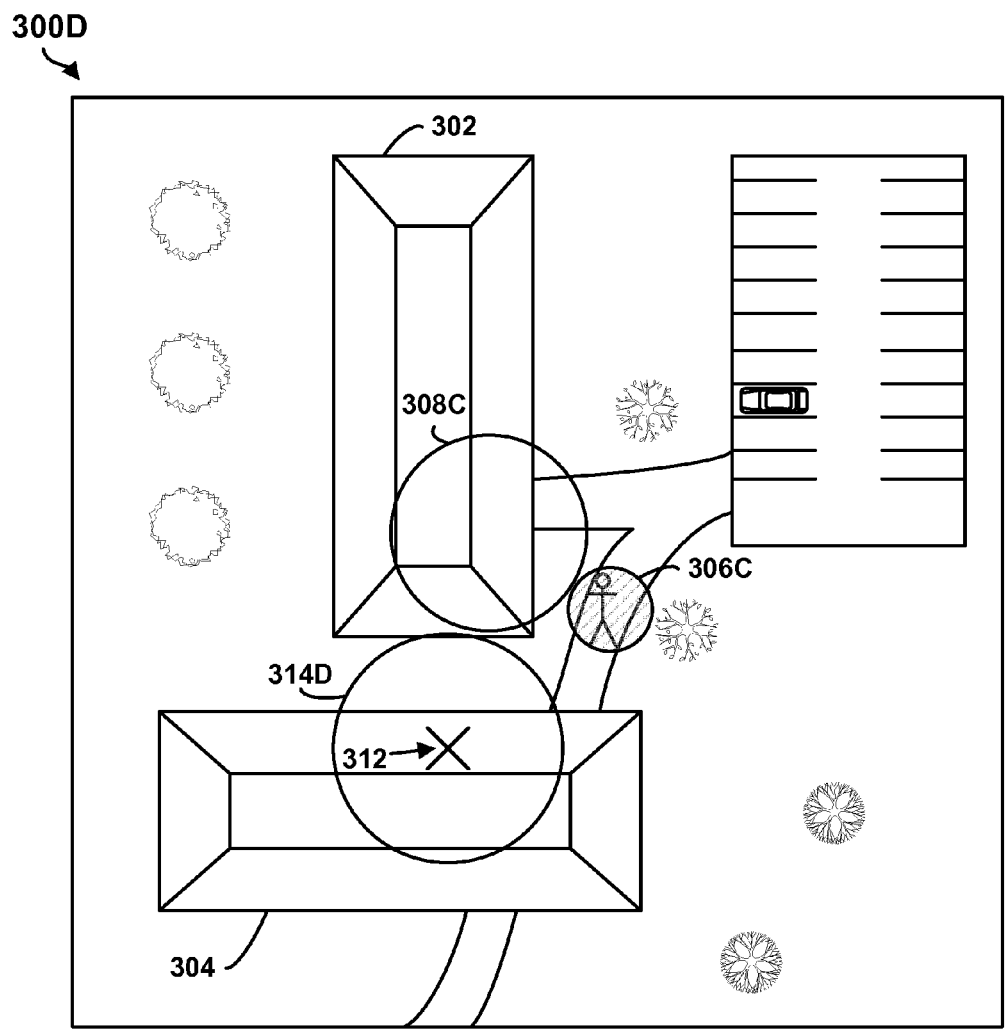

Referring now to FIGS. 3C-3D, FIGS. 3C-3D conceptually illustrate approximations that may be maintained by the mobile device when the user is located at a second position that is closer to the second building 304. It is assumed that, while the user walked from the initial position shown in FIGS. 3A-3B to the position illustrated in FIGS. 3C-3D, additional data indicating estimates of the geographic location of the mobile device was received. As a result, each of the GPS approximation and the Wi-Fi approximation has been updated.

As shown in FIGS. 3C-3D, the GPS approximation is represented by a circle 306C and the Wi-Fi approximation is represented by a circle 308C. FIGS. 3C-3D further show a location estimate 312 that may be received by the mobile device based on signals received from one or more wireless access points within the second building 304. In one example, the mobile device may determine that the location estimate 312 is not within a threshold distance of either the GPS approximation or the Wi-Fi approximation. As a result, the mobile device may start to maintain an additional Wi-Fi approximation. In FIG. 3D, the additional Wi-Fi approximation is represented by a circle 314D.

Figure 3E:
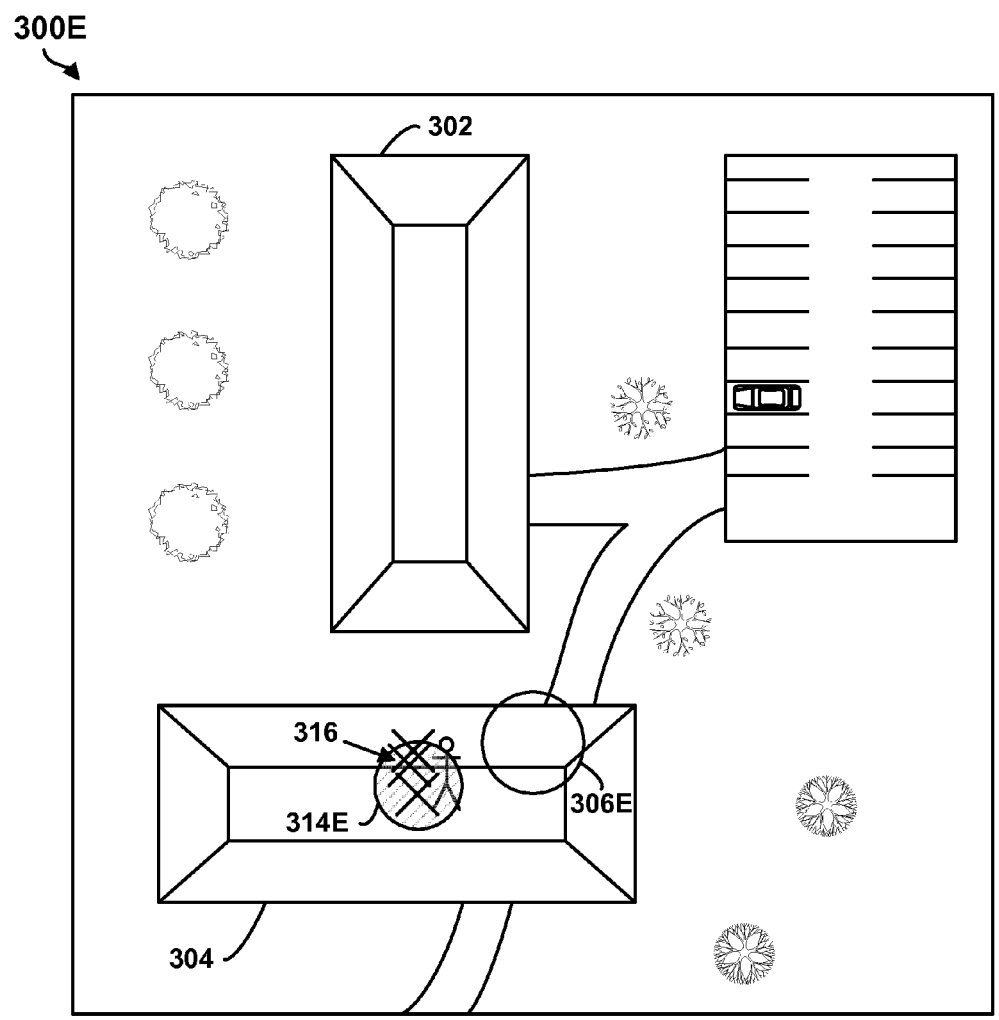

Finally, referring to FIG. 3E, FIG. 3E conceptually illustrates approximations that may be maintained by the mobile device when the user is located at a third position that is within the second building 304. Note that the GPS approximation is represented by a circle 306E in the FIG. 3E, but is no longer designated as the active approximation. Rather, the additional Wi-Fi approximation is designated as the active approximation.

In one example, in response to receiving a plurality of location estimates 316 that are within a threshold distance of the additional Wi-Fi approximation, which is represented by circle 314E, the mobile device may switch the active approximation to be the additional Wi-Fi approximation. Additionally, note that the first Wi-Fi approximation is no longer maintained by the mobile device. In one example, the mobile device may stop maintaining the first Wi-Fi approximation because the mobile device has not received any location estimates that are within a threshold distance of the first Wi-Fi approximation within a predetermined time period.

Although FIGS. 3A-3C describe approximation that are Wi-Fi approximation or GPS approximation, the examples are not meant to be limiting. In some examples, location estimates that are determined based on GPS data and Wi-Fi data may each be applicable to the same approximation. Therefore, some location approximations may filter both location estimates determined based on GPS data and location estimates determined based on nearby wireless access points. Moreover, although some of the examples herein have been described with respect to maintaining multiple approximations, it is noted that in some instances, a mobile device may maintain a single approximation. For example, at a given point in time, the mobile device may only be maintaining a GPS approximation, but may decide to begin maintaining a Wi-Fi approximation in response to receiving a location estimate that is not within a threshold distance of the GPS approximation.

Figure 4:
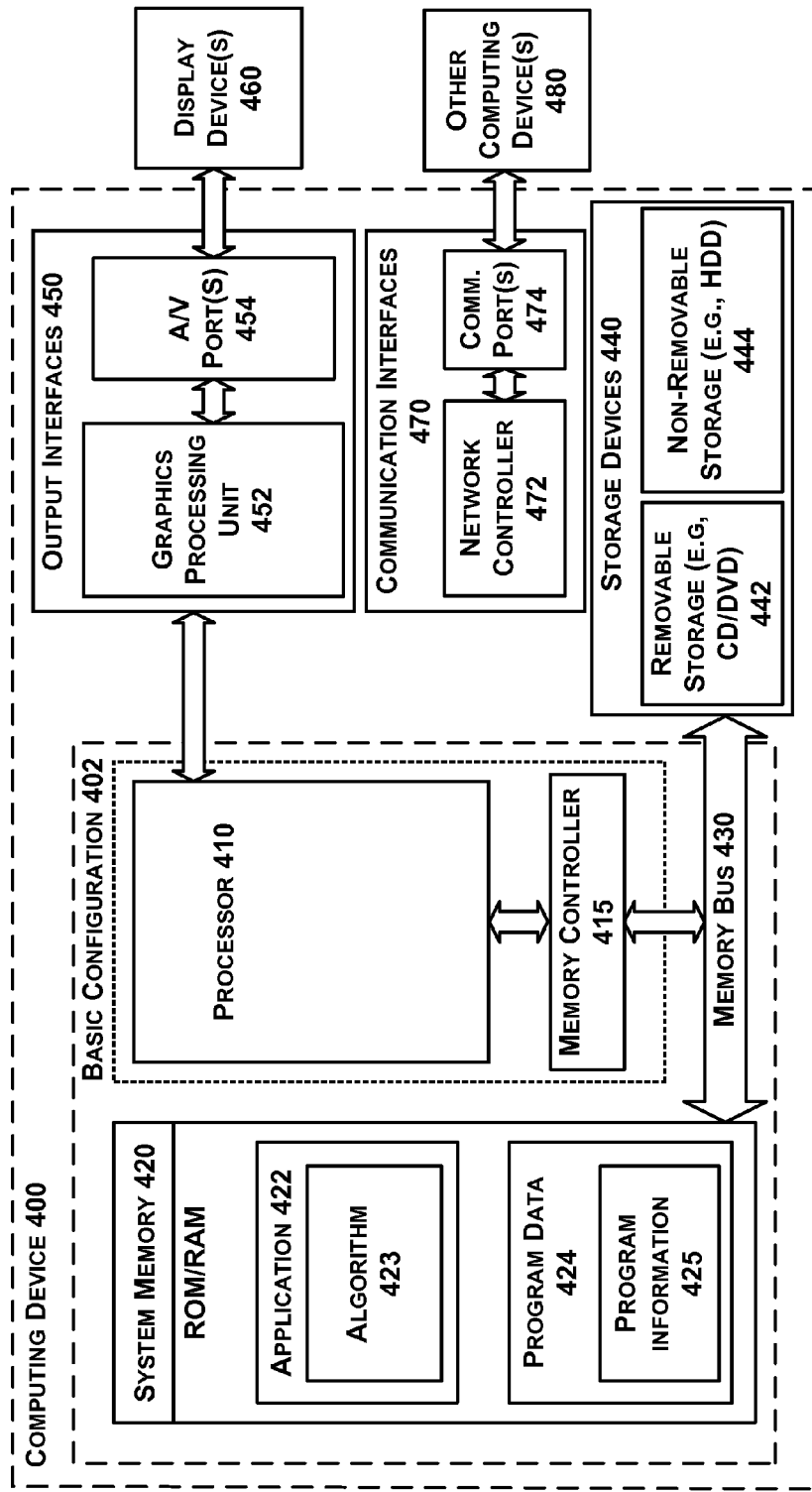
FIG. 4 is a functional block diagram illustrating an example computing device used in a computing system that is arranged in accordance with at least some embodiments described herein.

FIG. 4 is a functional block diagram illustrating an example computing device 400 used in a computing system that is arranged in accordance with at least some embodiments described herein. The computing device 400 may be implemented to determine sensor data using one or more sensor processors or perform any of the functions described above with reference to FIGS. 1-3. In a basic configuration 402, computing device 400 may typically include one or more processors 410 and system memory 420. A memory bus 430 can be used for communicating between the processor 410 and the system memory 420. Depending on the desired configuration, processor 410 can be of any type including but not limited to a microprocessor (µP), a microcontroller (µC), a digital signal processor (DSP), or any combination thereof. A memory controller 415 can also be used with the processor 410, or in some implementations, the memory controller 415 can be an internal part of the processor 410.

Depending on the desired configuration, the system memory 420 can be of any type including but not limited to volatile memory (such as RAM), non-volatile memory (such as ROM, flash memory, etc.) or any combination thereof. System memory 420 may include one or more applications 422, and program data 424. Application 422 may include an algorithm 423 that is arranged to determine a location of a mobile device, in accordance with the present disclosure. Program data 424 may include program information 425 that could be directed to any number of types of data. For instance, application 422 may execute an algorithm that is configured to maintain multiple location approximations, and provide an indication of an estimated geographic location associated with an active approximation. In some example embodiments, application 422 can be arranged to operate with program data 424 on an operating system.

Computing device 400 can have additional features or functionality, and additional interfaces to facilitate communications between the basic configuration 402 and any devices and interfaces. For example, data storage devices 440 can be provided including removable storage devices 442, non-removable storage devices 444, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 420 and storage devices 440 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of device 400.

Computing device 400 can also include output interfaces 450 that may include a graphics processing unit 452, which can be configured to communicate to various external devices such as display devices 460 or speakers via one or more A/V ports 454 or a communication interface 470. The communication interface 470 may include a network controller 472, which can be arranged to facilitate communications with one or more other computing devices 480 over a network communication via one or more communication ports 474. The communication connection is one example of a communication media. Communication media may be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer, including both laptop computer and non-laptop computer configurations, or a server.

Figure 5:
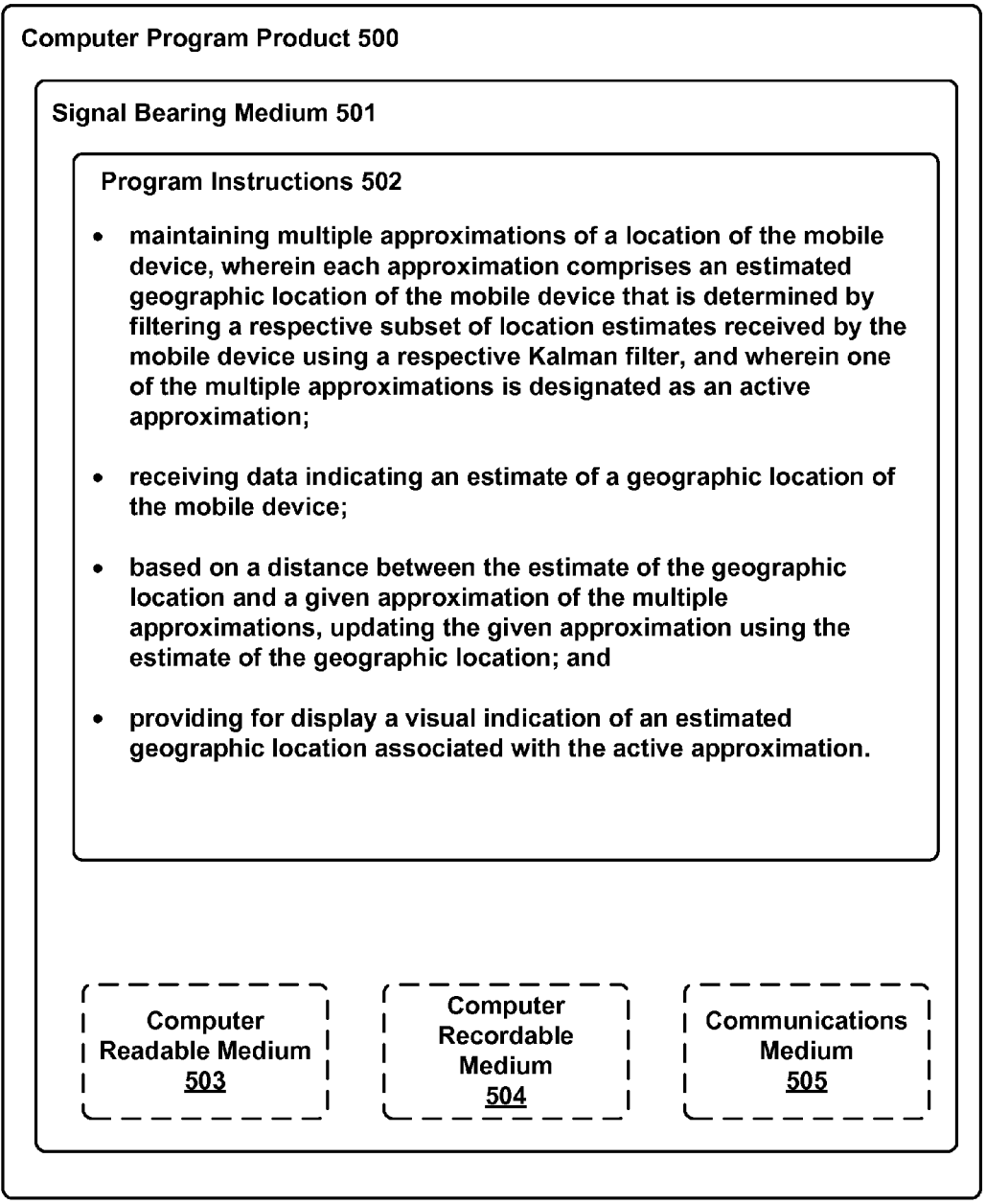

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein.

In one embodiment, the example computer program product 500 is provided using a signal bearing medium 501. The signal bearing medium 501 may include one or more programming instructions 502 that, when executed by one or more processors may provide functionality or portions of the functionality described above with respect to FIGS. 1-4. In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device 400 of FIG. 4 may be configured to provide various operations, functions, or actions in response to the programming instructions 502 conveyed to the computing device 400 by one or more of the computer-readable medium 503, the computer recordable medium 504, and/or the communications medium 505.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
maintaining, by a mobile device, multiple approximations of a location of the mobile device, wherein each approximation comprises an estimated geographic location of the mobile device that is determined by filtering a respective subset of location estimates received by the mobile device using a respective Kalman filter, and wherein one of the multiple approximations is designated as an active approximation;
receiving, by the mobile device, data indicating an estimate of a geographic location of the mobile device;
based on a distance between the estimate of the geographic location and a given approximation of the multiple approximations, updating the given approximation using the estimate of the geographic location; and
providing, by the mobile device and for display, a visual indication of an estimated geographic location associated with the active approximation.

2. The method of claim 1, wherein updating a given approximation of the multiple approximations based on a distance between the estimate of the geographic location and the given approximation comprises:
determining that a closest approximation to the estimate of the geographic location is the given approximation, and
responsive to determining that the closest approximation to the estimate of the geographic location is the given approximation, updating the given approximation.

3. The method of claim 1, further comprising designating the given approximation as the active approximation in response to subsequently receiving a predetermined number of estimates of geographic locations of the mobile device that are closest to the given approximation.

4. The method of claim 1, further comprising:
receiving data indicating a second estimate of a geographic location of the mobile device,
determining that the second estimate of the geographic location of the mobile device is not within a threshold distance of any of the multiple approximations, and
responsive to determining that the second estimate of the geographic location of the mobile device is not within a threshold distance of any of the multiple approximations, maintaining a new approximation based on the second estimate of the geographic location of the mobile device.

5. The method of claim 4, further comprising designating the new approximation as the active approximation in response to subsequently receiving a predetermined number of estimates of geographic locations of the mobile device that are closest to the new approximation.

6. The method of claim 1, further comprising discontinuing a particular approximation of the multiple approximations in response to subsequently receiving a predetermined number of estimates of geographic locations of the mobile device that are not within a threshold distance of the particular approximation.

7. The method of claim 1, further comprising discontinuing a particular approximation of the multiple approximations in response to having a predetermined time period elapse without subsequently receiving any estimates of geographic locations of the mobile device that are within a threshold distance of the particular approximation.

8. The method of claim 1, wherein the estimate of the geographic location of the mobile device is determined using a location-determination component selected from the group consisting of a global positioning system (GPS) and a Wi-Fi component.

9. The method of claim 1, wherein each respective subset is determined based on a respective manner of determining a location.

10. The method of claim 9:
wherein a first one of the multiple approximations comprises a Wi-Fi approximation, the Wi-Fi approximation having an estimated geographic location that is determined based on information collected by scanning for wireless access points within a wireless range of the mobile device, and
wherein a second one of the multiple approximations comprises a global positioning system (GPS) approximation, the GPS approximation having an estimated geographic location that is determined based on GPS data.

11. The method of claim 1, wherein each respective subset is determined based on a distribution of the location estimates such that each respective subset corresponds to a mode of the distribution.

12. A computer-readable medium having stored therein instructions, that when executed by a mobile device, cause the mobile device to perform functions comprising:

maintaining multiple approximations of a location of the mobile device, wherein each approximation comprises an estimated geographic location of the mobile device that is determined by filtering a respective subset of location estimates received by the mobile device using a respective Kalman filter, and wherein one of the multiple approximations is designated as an active approximation;

receiving data indicating an estimate of a geographic location of the mobile device;

based on a distance between the estimate of the geographic location and a given approximation of the multiple approximations, updating the given approximation using the estimate of the geographic location; and providing for display a visual indication of an estimated geographic location associated with the active approximation.

13. The computer-readable medium of claim 12, wherein updating a given approximation of the multiple approximations based on a distance between the estimate of the geographic location and the given approximation comprises:

determining that a closest approximation to the estimate of the geographic location is the given approximation, and responsive to determining that the closest approximation to the estimate of the geographic location is the given approximation, updating the given approximation.

14. The computer-readable medium of claim 12, wherein the functions further comprise:

receiving data indicating a second estimate of a geographic location of the mobile device, determining that the second estimate of the geographic location of the mobile device is not within a threshold distance of any of the multiple approximations, and responsive to determining that the second estimate of the geographic location of the mobile device is not within a threshold distance of any of the multiple approximations, maintaining a new approximation based on the second estimate of the geographic location of the mobile device.

15. The computer-readable medium of claim 12, wherein the estimate of the geographic location of the mobile device is determined using a location-determination component selected from the group consisting of a global positioning system (GPS) and a Wi-Fi component.

16. The computer-readable medium of claim 12, wherein the functions further comprise discontinuing a particular approximation of the multiple approximations in response to having a predetermined time period elapse without subsequently receiving any estimates of geographic locations of the mobile device that are within a threshold distance of the particular approximation.

17. A mobile device, comprising:
a processor; and
a computer-readable medium, configured to store instructions, that when executed by the processor, cause the mobile device to perform functions comprising:

maintaining multiple approximations of a location of the mobile device, wherein each approximation comprises an estimated geographic location of the mobile device that is determined by filtering a respective subset of location estimates received by the mobile device using a respective Kalman filter, and wherein one of the multiple approximations is designated as an active approximation;

receiving data indicating an estimate of a geographic location of the mobile device;

based on a distance between the estimate of the geographic location and a given approximation of the multiple approximations, updating the given approximation using the estimate of the geographic location; and providing for display a visual indication of an estimated geographic location associated with the active approximation.

18. The mobile device of claim 17, wherein updating a given approximation of the multiple approximations based on a distance between the estimate of the geographic location and the given approximation comprises:

determining that a closest approximation to the estimate of the geographic location is the given approximation, and responsive to determining that the closest approximation to the estimate of the geographic location is the given approximation, updating the given approximation.

19. The mobile device of claim 17, wherein the functions further comprise:

receiving data indicating a second estimate of a geographic location of the mobile device, determining that the second estimate of the geographic location of the mobile device is not within a threshold distance of any of the multiple approximations, and responsive to determining that the second estimate of the geographic location of the mobile device is not within a threshold distance of any of the multiple approximations, maintaining a new approximation based on the second estimate of the geographic location of the mobile device.

20. The mobile device of claim 17, wherein the estimate of the geographic location of the mobile device is determined using a location-determination component selected from the group consisting of a global positioning system (GPS) and a Wi-Fi component.

* * * * *